June 23, 1964  A. ROGUIN ETAL  3,138,710
DEVICES FOR DETECTING FISSIONABLE MATERIAL
JACKET BURSTS IN NUCLEAR REACTORS
Filed Nov. 14, 1960  4 Sheets-Sheet 1
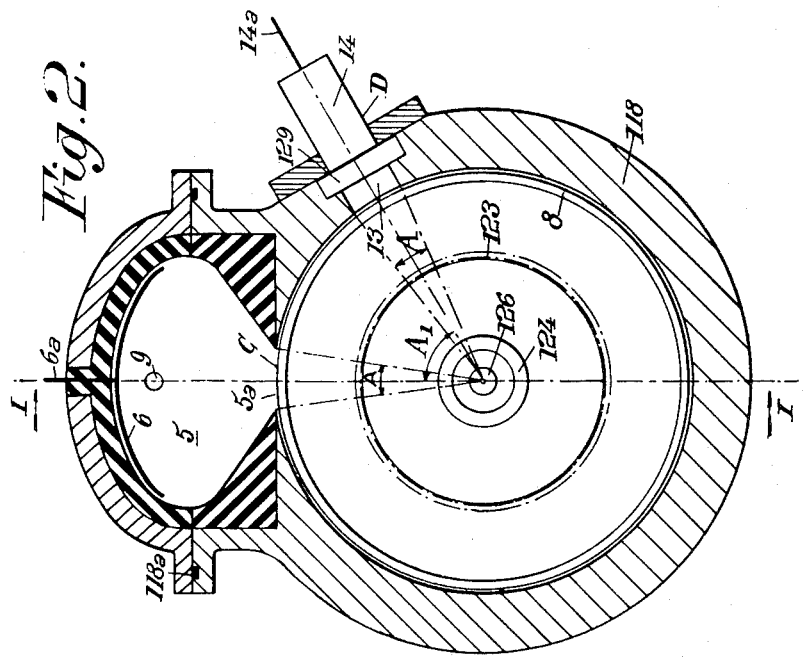
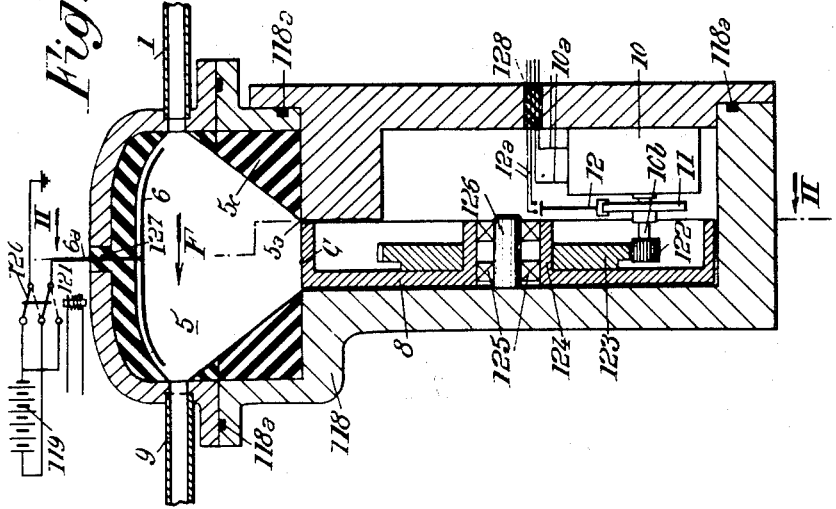
INVENTOR
BY
ATTORNEY

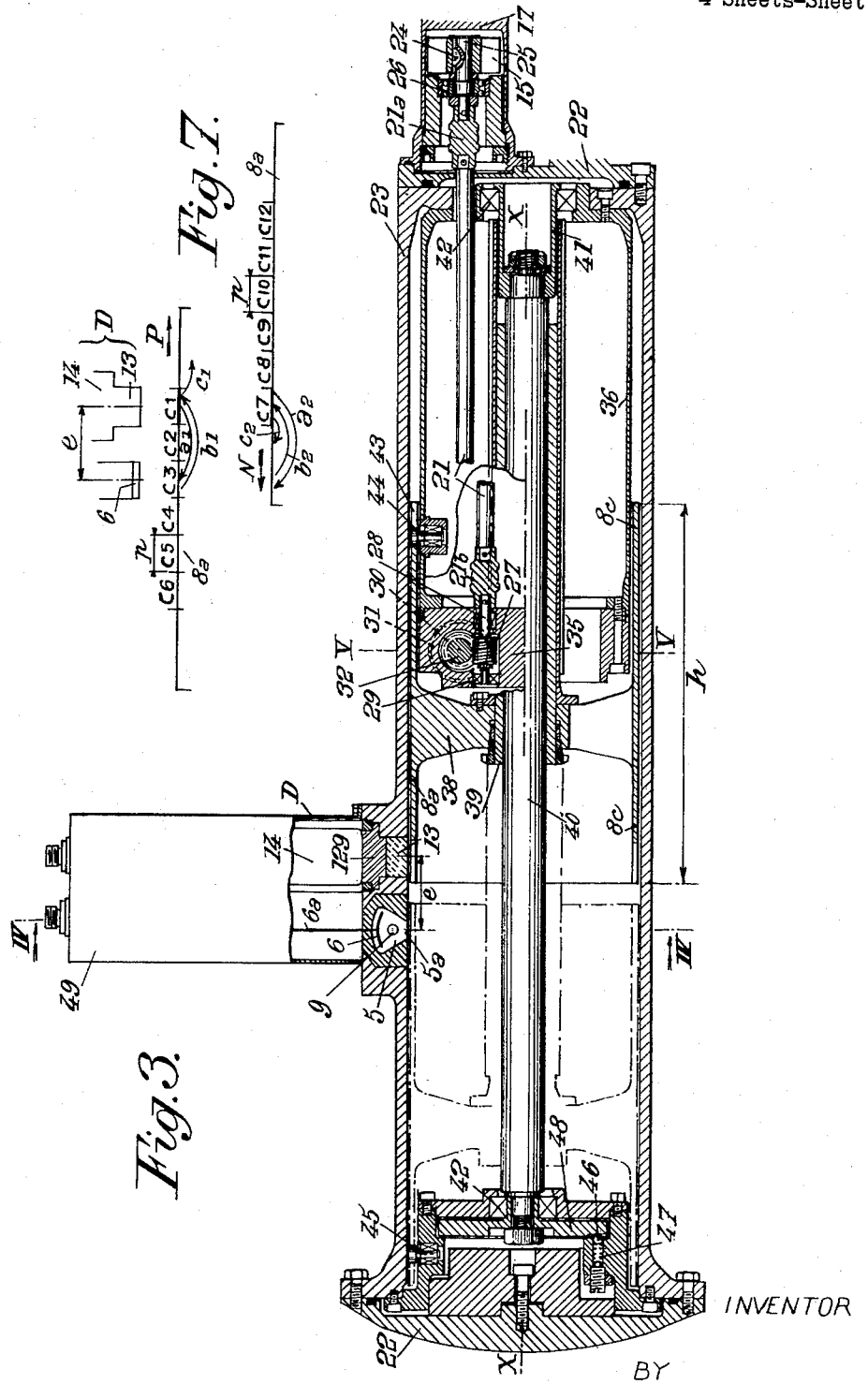

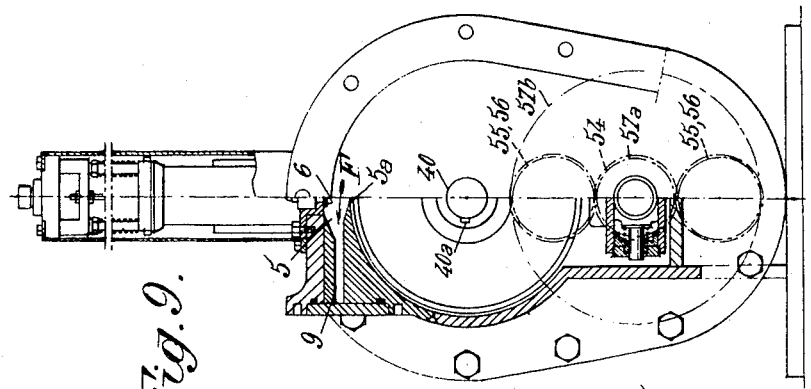
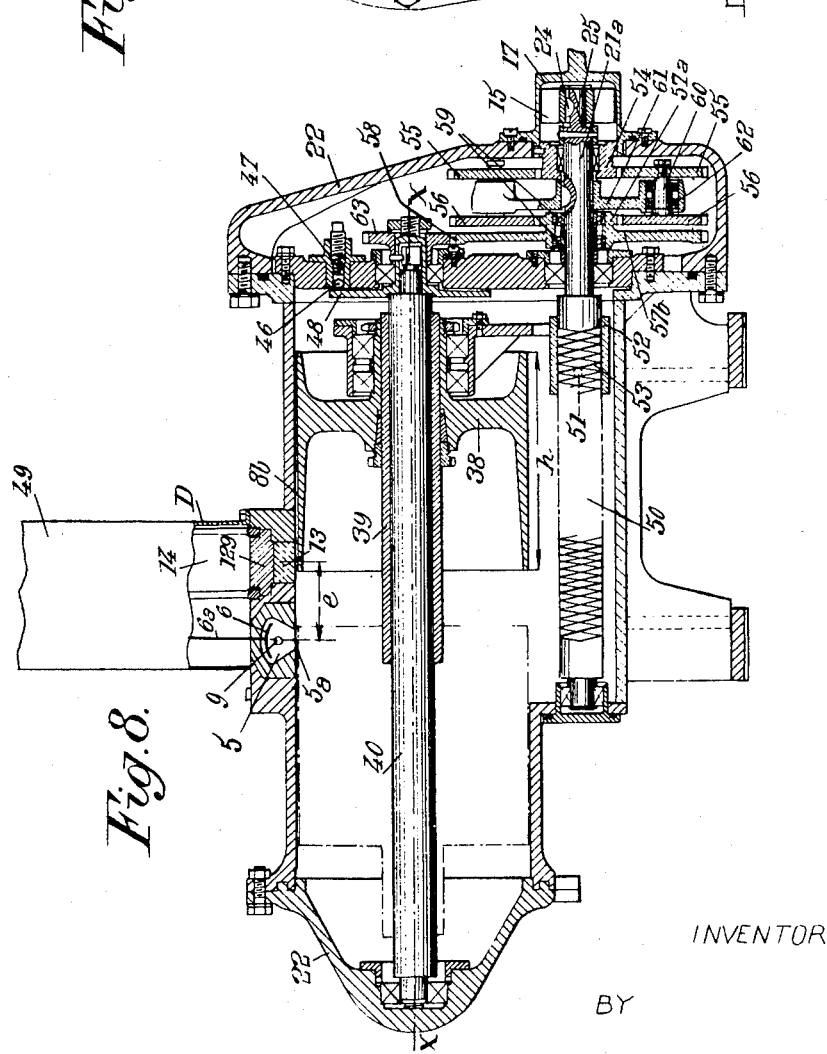

United States Patent Office 3,138,710
Patented June 23, 1964

3,138,710
DEVICES FOR DETECTING FISSIONABLE MATERIAL JACKET BURSTS IN NUCLEAR REACTORS
André Roguin, Antony, and René Donguy, Vanves, France, assignors to Commissariat a l'Energie Atomique, Paris, France, an organization of France
Filed Nov. 14, 1960, Ser. No. 68,778
Claims priority, application France Nov. 13, 1959
11 Claims. (Cl. 250—83.3)

The invention has for its object improvements in devices for detecting fissionable material jacket bursts in heterogeneous nuclear reactors cooled by means of a gas (such as air, carbonic acid gas) flowing, generally under pressure and in a closed circuit, in contact with said jackets.

In the prior U.S. patent application Ser. No. 817,811, filed on June 3, 1959, in the names of Jean Goupil, Jean Graftieaux and Jean Megy, for "Improvements in or Relating to the Monitoring of Fission Products in a Gaseous Stream, Particularly for Detecting Burst Slugs in Nuclear Reactors," there has been described an improvement to such devices which consists in detecting jacket bursts by determining the amount of very short life gaseous fission products, such as kryptons, and xenons, formed in the jackets from the fissionable materials and having flown into the coolant gas (or a fraction thereof) due to jacket bursts, this determination being made by causing the coolant gas (or the fraction thereof used for detection) first to stay for a short time in a suitable decay chamber in which said gaseous fission products are transformed by beta radioactivity into positive ions (such as rubidiums, cesiums, strontiums and bariums) capable of being adsorbed in metallic walls, then in causing it to pass between a fixed repulsion electrode and a sector of a movable metallic drum (for instance through a channel of small cross-section disposed tangentially to the drum which passes through an aperture thereof), said electrode directing the ions toward the metallic drum which collects them, and in displacing said drum so that successively the different sectors thereof are brought first opposite a radio-activity detector (such as a scintillation counter), then opposite said electrode and finally again opposite said detector, the difference between the two indications of the detector being substantially proportional to the amount of ions collected by the above mentioned sector of the drum, and consequently to the amount of very short life fission products present in the coolant gas.

Sensitivity in such a device is limited for the following reasons:

On the one hand, by the fact that the production of ions, by transformation of the gaseous fission products in the decay chamber, cannot be increased, for a given proportion of said products in the coolant gas, by increasing the time for which the coolant gas remains in this chamber (by increasing the volume thereof or by reducing the rate of flow of the gas therethrough), beyond a limit which depends upon the nature, the pressure and the temperature of the coolant gas, in view of the fact that the ions once they have been formed have a tendency to combine with the electrons (for instance those of the metallic walls of the chamber and those resulting from the beta rays generated in said chamber), which limits the possible concentration of the ions at the outlet of the decay chamber, and On the other hand, by the fact that a portion of the ions leaving said chamber is adsorbed between it and the drum sector that collects them, because these ions are subjected to the collecting electric field produced by the repulsion electrode only at the end of their travel.

The present invention is intended to increase the sensitivity of a detection device made as above described by increasing the number of ions collected by every sector or portion of the periphery of the drum for a given concentration of very short life fission products in the coolant gas, or the portion thereof used for detection, and secondarily by reducing the background noise by increasing the distance between the detector of the collection area and by reducing the residual or remanent activity of the different sectors of the drum when they enter into action during every cycle of operation.

Owing to this increase of sensitivity, we obtain a device which detects more rapidly and in a safer manner a jacket burst, even of little importance, while reducing either the flow rate of gas collected for detection (for instance from 1 to 2% of the total flow rate) which involves an economy of heat, or the number of detectors for the monitoring system of a nuclear reactor.

The invention consists chiefly in disposing—against the periphery of a movable metallic drum provided with means for displacing it according to a predetermined program so that successive areas of its periphery are brought first into a taring position opposite a radiation detector, then in an ion collecting position opposite a fixed repulsion electrode and thirdly in a measuring position, again opposite said radiation detector—a decay and ion formation chamber through which flows a gaseous stream that has been in contact with at least one jacket surrounding a fissionable fuel element of a heterogeneous nuclear reactor, said chamber being essentially characterized by the following features:

(a) It has an aperture which is closed in a gastight manner by a portion of the periphery of the drum, constituting a collecting area;

(b) Its walls flare off from said aperture in such manner that the volume of the chamber is relatively important (such that the time during which the gaseous stream remains therein is at least one and preferably several seconds), the whole of said chamber being visible from said collecting area and located at a small distance thereof, and (c) It comprises at least one electrode disposed at the end of the chamber opposite to said aperture and adapted to be brought to a high positive potential so as to constitute the fixed repulsion electrode.

In order to obtain full advantage of the gain of sensitivity, it is of interest to reduce to a minimum the remanent activity of the collecting area before every collection, and for this purpose, according to another feature of the invention, we increase the height of the drum and we give this drum, on the one hand a translatory movement and, on the other hand, a rotation movement, so as to bring successively all the portions of its periphery (the number of which may be more than one hundred) into position for collecting radioactive ions and into radioactivity measurement position.

According to this last mentioned feature, the metallic drum consists of an elongated cylinder of revolution having a height sufficient to comprise, in the direction of the axis of revolution, several adjacent collecting areas; the above mentioned detector and the fixed repulsion electrode are disposed opposite the periphery of the drum in the direction of the axis thereof and preferably substantially side by side, and means are provided for ensuring the displacement of said drum, on the one hand with a translatory movement in the direction of the axis, preferably a reciprocating movement having unequal amplitudes in the two opposed directions, so as successively to bring the different adjacent collecting areas disposed in a band comprised between two generatrices of the cylinder, first opposite said detector so as to measure the remanent radioactivity of said area, then opposite said repulsion electrode, brought to a high positive potential, to collect the positive ions of said gaseous stream repulsed by this electrode, finally opposite said detector so as to measure the radioactivity of said area after collection of the ions, and on the other hand with a rotation movement about said axis always in the same direction and with the same amplitude, after all the areas of a given band have been used, so as to permit of repeating with the areas of an adjacent analogous band the operations precedingly performed with the preceding band, the translatory displacements for passing from one area to the next one in a given band being advantageously reversed for two successive bands.

In a first embodiment of the invention, the elongated cylinder has a polygonal cross-section and the detector, for instance a scintillation detector, has a flat surface located in the immediate vicinity of the drum, which reduces the background noise due to the activity of the coolant gas (because the volume of this active gas between the collecting area and the scintillator is very small), but requires a disengagement of the drum from this surface during its movements of rotation.

According to a second embodiment, the elongated cylinder is of circular cross-section, which requires a detector having a curvilinear front face (therefore of more delicate construction) if it is desired to avoid an increase of the volume of gas admitted under the detector, but facilitates the rotation displacements of the drum and reduces the volume of the device by reducing the dead displacements of the drum necessary for its disengagement.

In both cases, all the displacements of the drum (both translatory and rotational displacements) are preferably produced by a rotation in one direction or the other, of a control shaft, by bringing for instance into action, for transmission of the movements from this shaft through a gastight casing, a magnetic coupling device.

Preferred embodiments of the present invention will be hereinafter described with reference to the accompanying drawings, given merely by way of example and in which.

FIGS. 1 and 2 of these drawings are two sections respectively in two directions perpendicular to each other (respectively I—I of FIG. 2 and II—II of FIG. 1) of a detection device according to the invention.

FIG. 3 is an elevational view, mostly in section, of a first embodiment of a device according to the invention making use of a reciprocating and rotary movement.

FIG. 7 is a diagram illustrating the translatory displacements of the drum used in the embodiment of FIGS. 3 to 6.

FIG. 8 shows in elevational view, mostly in section, a second embodiment of a detection device according to the invention wherein a reciprocating and rotary movement is used.

FIG. 9 is an end view (with the casing removed) of the device of FIG. 8.

Figure 4:
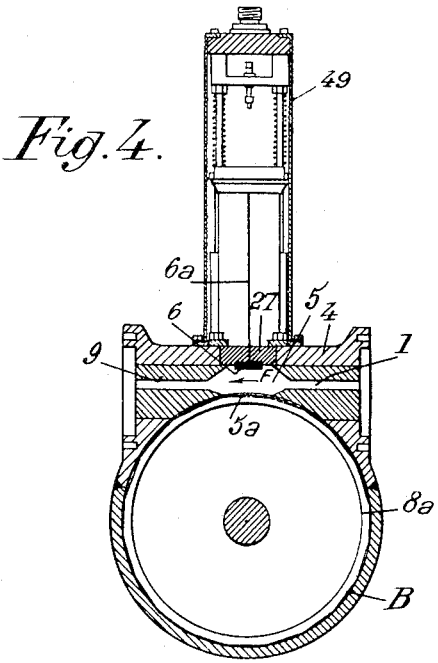
FIGS. 4 and 5 are sections, on the lines IV—IV and V—V, respectively, of FIG. 3.
Figure 5:
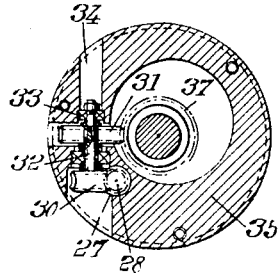

The device according to the embodiment of FIGS. 1 and 2 comprises a movable drum 8 provided with means for displacing it according to a predetermined program so that successive areas of its periphery are brought first in a taring position opposite a radiation detector, then in an ion collecting position opposite a repulsion electrode and thirdly in a measurement position, again opposite said radiation detector. Against the periphery of said movable drum is provided a decay and ion formation chamber 5 through which flows a gaseous stream F that has been in contact with at least one jacket surrounding a fissionable fuel element in a heterogeneous nuclear reactor. This chamber 5 is essentially characterized by the following features:

(a) It has an aperture 5a which is closed in a gastight fashion by a portion of the periphery of said drum, constituting a collecting area C;

(b) Its walls flare off from said aperture 5a so that the chamber has a relatively important volume (such that the time for which the gaseous stream F remains in chamber 5 is at least one and preferably several seconds), the whole of the chamber being substantially visible from said collecting area C and being at a small distance thereof; and (c) It comprises at least one electrode 6 disposed at the end of the chamber opposed to said aperture 5a and adapted to be brought to a high positive potential.

The gaseous stream F which may contain gaseous fission products (the presence of which indicates a jacket burst), after having passed through a filter not shown which retains solid particles such as solid fission products, enters through a conduit 1 into chamber 5 where the very short life gaseous fission products disintegrate into solid positive ions adsorbable by a metallic surface with an emission of beta rays according to a nuclear reaction of the type $_{36}Kr$ (neutral atom) with 36 peripheral electrons→$_{-1}e$(beta ray)+$_{37}Rb$ (positive ion) with less than 36 peripheral electrons due to the fact that the quick beta electron drives along several peripheral electrons of the atom→$_{-1}e$(beta ray)+$_{38}Sr$ (positive ion several times ionized with less than 36 peripheral electrons, a new drive of peripheral electrons being ensured by the quick beta electron).

Electrode 6, when it is brought to a high positive potential (ranging from 1,000 to 4,000 volts according to the pressure existing in chamber 5), to wit that of battery 119 supplied through double switch 120 when this switch has been brought into the position shown in solid lines in FIG. 1 under control of relay winding 121, constitutes for the positive ions formed in said chamber a repulsion electrode which projects them onto said collecting area C where they are adsorbed. The remainder of the gaseous stream F leaves chamber 5 through conduit 9 to be for instance recycled into the nuclear reactor.

In order to reduce as much as possible the leaks of radioactive coolant gas, we dispose the whole of chamber 5 and drum 8 in a gastight casing 118 made of several portions (with the interposition of packing joints 118a) so as to permit of easily taking it to pieces. The portion of the casing that limits chamber 5 is provided with insulating walls 5c in such manner that electrode 6 (and possibly other electrodes which ensure an improved focussing of the positive ions onto collecting area C) repulses the positive ions toward the drum. Advantageously, we house in the same casing 118, the electric motor 10 which serves to rotate drum 8 in both directions, as in the above mentioned prior patent application, under control of a mini-switch 12 controlled by a cam 11 secured on the shaft 10b of motor 10, the drive of this motor being transmitted through speed reducing gears including a pinion 122 fixed on shaft 10b and a toothed wheel 123 secured on the hub 124 of drum 8. This drum is mounted on bearings 125 in such manner as to be rotatable about axis 126. The gear ratio (i.e. the ratio of the number of teeth of wheel 123 to that of the pinion 122) is advantageously such that one revolution of shaft 10b corresponds to a rotation of the drum through the angle $A_1$ which separates the taring position from the collecting position (and also this last mentioned position from the measurement position). It will be noted that, due to the fact that the walls of chamber 5 flare off from aperture 5a, angle $A_1$ is greater than the angle A under which the aperture 5a of chamber 5 is seen from the axis of drum 8 in the section illustrated by FIG. 2, this angle A being equal to $360°/n$, n being the number of collecting areas C on the periphery of the drum and the number of different positions that can be occupied by the drum. Besides, for reasons which will be hereinafter stated, angle $A_1$ is a multiple of angle A, that is to say $A_1=m_A$ (m being an integer) and numbers m and n are incommensurable numbers (for instance $n=20$ and $m=3$ or $n=24$ and $m=5$).

The conductor 6a of electrode 6 and the conductors 10a and 12a of motor 10 and mini-switch 12 pass through plugs 127 and 128 made of an insulating material and extending through the wall of casing 118.

Taring and radioactivity measurement for every area, respectively before and after the collection of ions, are effected by means of a nuclear radiation detector D of a known type, disposed at some tenths of millimeter of the periphery of the drum, for instance by means of a scintillation detector including an element 13 (which is seen from the axis of the drum under an angle substantially equal to A) made of a scintillating substance which is particularly sensitive to beta rays, in which the radiations of radioactive origin and in particular the beta rays (resulting from the beta radioactivity of the solid ions that are collected) produce light flashes or scintillations which pass through a plate 129 of a transparent substance (which may possibly vary the wave-length of the scintillations) and which are transformed into current pulses by means of photo-multiplier 14, these pulses appearing in conductor 14a and being dealt with as indicated in the above mentioned prior patent application. A calculating device provided with memory means measures the difference between the activity after collection and the activity before it of every collecting area C in such manner as to determine the activity due to only the ions collected by the area in question.

The operation of the device which has been above described is similar to that of the device of the above mentioned prior patent application, in particular to that indicated as a modification including not an electrode 3 but only a repulsion electrode 6 successively brought to a high negative potential to permit taring of the collection area and to a high positive potential to ensure the collection of ions by said area, and once more to a high negative potential during the period for measuring the collected ions.

For every collecting area C, a complete cycle of operations therefore comprises:

(1) A taring period which may last for instance about 12 seconds and during which the area C that is considered is located opposite a scintillating substance 13, photo-multiplier 14 sending into the memory calculating device (not shown) a number of pulses which depends upon the residual or remanent radioactivity of said area, which is very low due to the fact that since the time of the last ion collection effected on this area, there has been a period of time many times greater than the radioactive periods of most of the ions that are collected. During this taring period, winding 121 is not fed with current and switch 120 occupies the position shown in dotted lines, which has for its effect to bring to a high negative potential the electrode 6 which then collects the ions passing through chamber 5 and prevents them from reaching the periphery of the drum;

(2) An ion collecting period for the same area which may last for about 20 seconds and during which said area just closes the aperture 5a of chamber 5, winding 121 being fed with current so as to move switch 120 into the position shown in solid lines, which brings electrode 6 to a high positive potential owing to which it repulses the positive ions present in stream F toward area C. During this period, the output of photomultiplier 14 does not act upon the memory calculator device;

(3) A period for measuring the radioactivity of said area, which may last for about 12 seconds, during which the area that is considered is again located before the scintillating substance 13, no current being fed to winding 121. The memory calculator device now receives a number of pulses depending upon the sum of the remanent activity and of the activity due to the ions collected during the preceding collecting period and it subtracts therefrom the pulses corresponding to the remanent activity preserved by the memory means. The output of this calculator device therefore depends exclusively upon the activity of the ions that have been collected and consequently upon the amount of very short life fission gas present in the gaseous stream, which directly depends upon the importance of the burst of the jacket along which the gaseous stream has been passing.

The calculator device may be constituted for instance by a mere scale or counter of the type commonly used with scintillation detectors (for instance a scale devised by the Commissariat à l'Energie Atomique, of the type described in "Techniques de l'Ingénieur," vol. Electronique, Tome I, pages E.1900–4 and E.1900–5) which counts the pulses issuing from photomultiplier 14 (possibly after amplification in an amplifier), this counter working in both directions, that is to say first subtracting from zero the taring pulses before positively counting the measurement pulses.

Instead of a memory calculator device of the numerical type, we may also make use, without departing from the scope of the invention, of an analog memory device. In this case, the output circuit of photomultiplier 14 includes an amplifier, a device for shaping the pulses and an integrator (all of them of the type known in the art of radiation measurement devices) so as to supply an output signal representative of the number of scintillations in scintillator element 13. This output signal is then directed toward a memory device of the type described and shown (FIG. 2) in the French patent of Commissariat à l'Energie Atomique No. 1,188,100 of December 4, 1957, including a relay which transfers between the taring and measurement positions, and the output of the last mentioned device is connected with a recorder and an alarm device in case of the safety limit being exceeded.

The control means for energizing winding 121, for reversing the counting of the scale (or energizing the relay of the analog memory device) and for rotating motor 10 either in one direction or in the other are obtained by means of a programing element (not shown), for instance of the roto-contacting type, which then supplies with current for the desired durations of time and in the desired order, winding 121, the control device of the scale and the windings for forward and rearward running of motor 10, rotation of the shaft 10b of this motor serving to operate, through cam 11, mini-switch 12, which stops the motor by means of a brake not shown. We thus obtain, in the desired direction, the rotation of shaft 10b through one complete turn and consequently of drum 8 through an angle $A_1$. If, in FIG. 2, the clockwise direction is considered as a positive one, we obtain for a given area C of the drum located initially in the position shown by the drawings opposite electrode 6.

A rotation of $+A_1$ to bring it into taring position,

A rotation of $-A_1$ to bring it into collecting position (and during this period electrode 6 is brought to the high positive potential), A rotation of $+A_1$ to return it opposite detector 13 for the measurement period.

A further rotation of $+A_1$ will bring the next area, located at the rear of that above mentioned, at a point of the drum making an angle $A_1$ with the first mentioned one, into the taring position and the cycle is again repeated for this second area.

Therefore we have successive rotations of $+A_1$, $-A_1$, $+A_1$, $+A_1$, $-A_1$, $+A_1$, $+A_1$, $-A_1$, etc. Therefore, the shaft 10b of motor 10 is driven, under control of the above mentioned programing element and mini-switch, according to a program which comprises two successive rotations of one revolution in a first direction (corresponding to a rotation of $+A_1$ of drum 8) separated by a single rotation of one revolution in the reverse direction (corresponding to a rotation of $-A_1$ for drum 8).

This simplification of the program results from the choice of numbers $m$ and $n$ so they are incommensurable owing to which we use successively all the areas of angle A of the drum (there are $n$ zones if $A=360°/n$).

The detecting device above described has in particular the following advantages:

Its selectivity is excellent because it is responsive only to the effects of very short life fission products and eliminates the activity of long life fission products (which accumulate when the coolant of the nuclear reactors is effected in a closed circuit, which is generally the case) and of the radioactive isotopes, such as argon 41 and nitrogen 16, formed in the coolant gas by the neutronic bombardment undergone in the reactor, and also the remanent activity of the drum.

Its accuracy and sensitiveness are very high due to the fact that it permits of collecting ions during a relatively long period during which their recombination with free electrons is prevented, because said ions are subjected to an electric field which directs them toward the drum as soon as they are formed.

It therefore permits a safe and quick detection of the jacket bursts before they have reached a dangerous state.

It permits of reducing the amount of coolant gas collected for detection purposes (which saves heat) and/or the number of detectors to be used for monitoring the whole of the jackets.

Its structure is compact due to the fact that it comprises a single chamber located in close proximity to the drum.

In order further to increase accuracy, by reducing the radioactivity of the collecting area, before collection, we advantageously make use, instead of a rotary drive of drum 8, as shown by FIGS. 1 and 2, of a helical drive or, according to another feature of the invention, a movement of translation and rotation, the drum then having in both cases the shape of a cylinder of sufficient height to have several collecting areas disposed side by side along the height, which permits of increasing the number of collecting areas.

We will describe two embodiments of such a device with reference to FIGS. 3 to 7 and 8 and 9 respectively. In these embodiments, the movable metallic drum 8a (first embodiment) or 8b (second embodiment) is first made to cooperate with a radioactivity detector D (which is preferably of the scintillation type and therefore includes a scintillating substance 13 the scintillations of which pass through the block 129 of transparent substance to be transformed into electric pulses by a photomultiplier 14) and with a fixed repulsion electrode 6 which is to be brought (by means of a conductor 6a) to a high positive potential. We circulate through a decay chamber 5 open at 5a, between said electrode 6 and the periphery of said drum 8a or 8b, the gaseous stream F which may contain radio-active positive ions (these ions being due to transmutation of the gaseous fission products passing into the coolant gas as a result of a jacket burst), this stream passing perpendicularly to the axis XX of drum 8a or 8b through inlet conduits 1 and outlet conduits 9 disposed on either side of electrode 6.

According to the present invention, this drum consists of an elongated cylinder of revolution, of a height $h$ sufficient to comprise in the direction of the axis of revolution XX several adjacent collecting areas C.

Said detector D and said electrode 6 are disposed opposite the periphery of the drum in the direction of the axis thereof and preferably substantially side by side.

We provide means for moving said drum, on the one hand in the direction of axis XX with a translatory movement, preferably a reciprocating one having unequal amplitudes in the two directions of reciprocation, so as successively to bring the different adjacent collecting areas C disposed in a band B extending between two generatrices G of the cylinder, first opposite said detector D so as to measure the remanent radioactivity of said area, then opposite said repulsion electrode 6 brought to a high positive potential to collect the positive ions of said gaseous stream F repulsed by this electrode, thirdly opposite said detector D to measure the radioactivity of said area after collection of the ions, and on the other hand by rotation about said axis XX always in the same direction and with the same amplitude, after all the areas C of a given band B have been used, so as to permit of repeating with the areas of an adjacent analogous band the operations precedingly performed with said preceding band, the translatory displacements for passing from one area to the next one in a given band being advantageously reversed for two successive bands.

Figure 6:
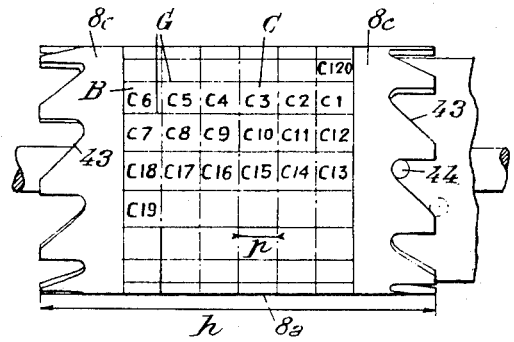
FIG. 6 is an external view of the drum of the detection device of FIG. 3.

In a first embodiment illustrated by FIGS. 3 to 6, drum 8a is of polygonal cross-section. It includes for instance 20 faces each of which constitutes a band B with 6 areas, so that its total number of areas is 120 (as shown by FIG. 6). The scintillator 13 of detector D is located parallel to one face of the drum, which reduces the volume of radioactive gas between a collecting area C and the scintillating substance 13 (and therefore the background noise of the detector) and which permits of using a scintillator element 13 having a flat inlet surface.

The displacement of drum 8a, in such manner as to ensure the passage of the 120 areas in the order indicated by FIG. 7 successively in front of scintillator element 13, electrode 6 and again scintillator element 13, while producing the desired disengagement of the drum from the flat surface of scintillator element 13 during the movements of rotation of the drum, may be advantageously obtained by mere rotation, in one direction or the other, of a single control shaft 21 supported by two flexible coupling means 21a and 21b, which permits of having recourse, to transmit through a gas tight bell-shaped member 17 screwed on one of the covers 22 of casing 23 (which contains drum 8a and the means for transmitting thereto the movements of shaft 21), to a magnetic coupling device which acts upon pole pieces 15 fixed by means of disc-shaped fixation means 24 on an axis 25 rotatable in a bearing 26 and connected through flexible coupling means 21a to shaft 21.

The means, housed in casing or body 23 to transmit a rotation of shaft 21 to drum 8a, comprise:

An endless screw 27 fixed on a shaft 28 (mounted in such manner as to be able to rotate in two bearings 29 and driven in rotation by shaft 21 through flexible coupling means 21b), A worm wheel 30 meshing with worm 27, A wheel 31, fixed on the same axis 32 as wheel 30, this axis being journalled in two bearings 33 mounted in a bore 34 provided in a bracket 35, A worm 37 meshing with worm wheel 31 and rigid with drum 8a.

This mechanical system is housed in a tubular envelope 36 which serves to separate the mechanical means from the radioactive fluid and to reduce the volume of dead gas.

Drum 8a consists of a tube of polygonal cross-section carried by a hub 38. This hub is fixed on a shoe 39 slidable in a slideway 40, so as to permit the translatory movements of the drum between two limit positions shown one in solid lines (for which position the polygonal tube penetrates into casing 23 and tube 36) and the other in dot-and-dash lines on FIG. 3. This slideway 40 is mounted, together with its support 41, in two bearings 42 so as to permit the movements of rotation of drum 8a.

These movements of rotation, each of which is of a twentieth of a revolution (i.e. 18°) in the case of a drum having twenty bands B, are obtained, when the drum reaches either of its limit positions, through control means of the desmodromic type, that is to say which automatically produces a rotation. Such a rotation may be obtained by means of inclined surfaces 43 provided at every end of the drum and cooperating with a finger 44, 45 running along one of the inclined surfaces, these surfaces being inclined in opposed direction at each end so as to ensure a rotation of drum 8a always in the same direction. In order to bring slideway 40 and consequently drum 8a always in correct position, after every rotation, there is provided a marking device which includes a ball 46 pushed by a spring 47 into notches disposed at regular intervals in a disc 48 turning together with slideway 40.

The gear ratios may be as follows:

Worm 27 (two threads, module 1)/wheel 30 (pitch circle diameter $d_1=20$ mm. and twenty teeth, therefore module 1): 1/10, i.e. $r_1$;

Wheel 31 (pitch circle diameter $d_2=40$ mm. and forty teeth, therefore module 1)/worm 37 (eight threads, module 1): 5/1, i.e. $r_2$.

The total ratio for translation is $r_1 \times r_2$ i.e.

$$\frac{1}{10} \times \frac{5}{1} = \frac{1}{2}$$

that is to say a translatory displacement of one pitch $p$ for two revolutions of axis 21, every pitch being equal to $$d_1 \times \pi \times \frac{1}{r_2}, \text{i.e.} \frac{40 \times 3.14}{5} = 25 \text{ mm. approximately}$$

Advantageously, a distance $e$ equal to 50 mm., i.e. two pitches, is provided between the axis of electrode 6 and the axis of detector D, the whole of the electrode and of scintillator 13 with its light conduit and with the photomultiplier 14 being housed in a casing 49 protected against the light of the surrounding space. A rotation of four revolutions of shaft 21 therefore permits of obtaining the passage of a given collecting area of drum 8a, from the electrode to the detector or inversely.

In order to obtain a rotation of $\frac{1}{20}$ of a revolution of the drum for a translatory displacement of one pitch thereof, we give an angle of 45° to inclined surfaces 43 and a diameter of 160 mm. to drum 8a. In this case, a forward displacement of one pitch, i.e. 25 mm., of the drum produces a rotation of 25 mm. measured on the periphery thereof, which corresponds to an angular rotation of $$\frac{25}{160 \times \pi} = \frac{1}{20} \text{ of revolution}$$

The operation of the device which has been described with reference to FIGS. 3 to 6 is as follows, in particular with reference to FIG. 7.

Drum 8a being initially for instance in the limit position shown in dot-and-dash lines in FIG. 3, area $C_1$ (FIGS. 6 and 7) is brought opposite the scintillator element 13 of detector D by rotation of shaft 21 in a first direction, hereinafter called positive direction, and corresponding to the direction of translatory displacement illustrated by arrow P on FIG. 7. Measurement of the remanent radioactivity of this area is effected as in the above mentioned prior patent application. Then a rotation of four revolutions of shaft 21 in the reverse direction (hereinafter called negative direction and corresponding to the direction of arrow N on FIG. 7) takes place so as to bring this area $C_1$ opposite electrode 6 (displacement $a_1$ on FIG. 7) brought to a positive potential; this area collects the positive ions of the gaseous stream F as in the above mentioned prior patent application. Then a rotation of four turns in the positive direction of shaft 21 returns, through displacement $b_1$, area $C_1$ to a position opposite detector D which measures the present activity of this area which is substantially equal to the remanent activity increased by a value representing the amount of positive ions collected and therefore the short life gaseous fission products which have passed into the coolant gas due to a jacket burst. As in the above mentioned prior patent application, a calculator (not shown) is provided to subtract from the present activity the remanent activity set in the memory means of the calculator, so as to obtain the value representing the positive ions that have been collected.

Area $C_1$ having finished its cycle (which comprises a taring operation, a collecting operation and a measurement operation), shaft 21 is rotated through two revolutions in the positive direction, which gives the drum a translatory displacement of one pitch (displacement $c_1$) and brings area $C_2$ opposite detector D. The cycle above described for area $C_1$ is then repeated for area $C_2$, and then successively for areas $C_3$, $C_4$, $C_5$ and $C_6$. When the cycle of area $C_6$ is finished, the rotation of shaft 21 to turn in the positive direction causes drum 8a to turn through one twentieth of a revolution, so that this drum now comes into the position illustrated in solid lines on FIG. 3 (which is also the position illustrated by FIG. 6). Now the areas $C_7$ to $C_{12}$ of the adjacent band B are used for detection, the displacements for every area, for instance for area $C_7$, being $a_2$, to pass from the taring position to the collecting position; $b_2$ to pass from this last position to the measurement position; and $c_2$ to bring the next area, in this case $C_8$, into the taring position. When area $C_{12}$ has been utilized, there is produced, during the next displacement $c_2$, a rotation of $\frac{1}{20}$ of a revolution of drum 8a which again occupies the left position (in dot-and-dash lines) on FIG. 1, and a new series of measurements may be repeated with the areas $C_{13}$ to $C_{18}$ and so on.

It will be found that displacements $a_2$ and $b_2$ are identical to displacements $a_1$ and $b_1$ respectively, whereas $c_2$ is reversed with respect to $c_1$. This relation is also applied to the directions of rotation of shaft 21, the drive of which by means of the magnetic coupling device takes place through a predetermined program which complies with the above stated requirements and which further serves to feed electrode 6 with a high positive voltage during the collecting periods, this feed being interrupted during the taring and measurement periods so as to avoid increasing the radioactivity of the areas close to that that is being used.

When the one hundred and twenty areas $C_1$ to $C_{120}$ have been used, the operations are repeated with area $C_1$ the remanent activity of which has then dropped to a very low value (the duration of the cycle for the one hundred and twenty areas may be two hours if the operations for one area last one minute).

It will be noted that the polygonal cross-section of drum 8a (visible for instance on FIG. 4) makes it necessary to give an important displacement to the drum at the end of the translatory movement thereof so that the polygonal portion is disengaged from electrode 6 and scintillator element 13 (see the two end positions of the drum shown on FIG. 3 for which it is a cylindrical portion 8c of the drum, of a diameter slightly smaller than that of the circle inscribed in the polygon that is located opposite the electrode or the scintillator element).

It is possible to reduce these dead displacements (which have not been taken into account in the above description of the operation), and consequently the volume of the apparatus by having recourse, as shown by FIGS. 8 and 9, to a cylindrical drum 8b, which avoids the necessity of disengaging elements 6 and 13 at the end of every translatory displacement to permit rotation of the drum, but somewhat increases the volume of gas admitted under scintillator element 13 or requires a scintillator device having an input face of a shape corresponding to that of the periphery of the drum.

As for the control of displacements of drum 8b, it may be effected as that of the drum 8a by means of a control shaft 21a driven in rotation, in one direction or the other, by means of a magnetic coupling device acting, through a bell-shaped element 17, on the pole pieces 15 fixed on an axis 25 by disc-shaped fixation devices 24.

The translatory drive of drum 8b on slideway 40, between the two end positions shown by FIG. 8, from the rotary movement of shaft 21a, is obtained for instance by means of a screw 50 having right and left threads, carried by said shaft, and of an oscillating finger 51 carried by a sleeve 52, rigid, as to the rotary displacement, with the hub 38 of drum 8b, said finger being housed in a groove 53 of a thread of screw 50.

On the contrary, the drive of drum 8b in rotation is ensured by means of a speed reduction system including an epicycloidal gear train. This train comprises a toothed wheel 54 fixed on shaft 21a, planet-wheels 55, 56, wheels 55 being in gear with wheel 54 and wheels 56 with a toothed wheel 57a rigid with a toothed wheel 57b having two teeth 58. The whole of the toothed wheels 57a, 57b is mounted on shaft 21a so as to be freely movable about it, due to the provision of bearings 59, whereas every pinion 55 rotates together with a pinion 56, both of these pinions being fixed on a common axis 60 carried by an arm 61 (turning together with shaft 21a) in which this axis can turn freely owing to the provision of bearings 62.

As for wheel 57b, provided with two teeth, it meshes on every revolution with a toothed wheel 63 fixed on slideway 40 which has a pin 40a cooperating with a groove of the sleeve 39 which carries drum 8b so that this drum is thus driven in rotation at the same time as the disc 48 mounted on slideway 40.

In order to obtain a forward movement equal to one pitch of 25 mm. every time shaft 21a makes two revolutions, screw 50, which has two threads, must have a pitch of 12.5 mm. In this case, the passage from the detector to the electrode and reversely for a given collecting area requires a rotation of four revolutions of shaft 21a. If there are six areas in every band, as in the first embodiment, the stroke for the six areas corresponds to twelve revolutions of screw 50, to which will be added for instance one revolution and a half at every stroke end of drum 8b, that is to say, as a whole, fifteen revolutions of shaft 21a. At the end of these fifteen revolutions, rotation of drum 8b is obtained by meshing of the two teeth 58 of wheel 57b with the teeth of wheel 63. In order to obtain one revolution of wheel 57b every time shaft 21a has made fifteen revolutions, there must be provided a final speed reduction ratio of 1/15 between toothed wheels 54 and 57b. For this purpose, we may use the following epicycloidal gear train:

Wheel 54_____ 28 teeth, module 2.
Pinions 55_____ 30 teeth, module 2.
Pinions 56_____ 29 teeth, module 2.
Wheel 57a_____ 29 teeth, module 2.

Finally, in order to obtain that, for every revolution of wheel 57b which has two teeth (and the pitch circle diameter of which is for instance 174 mm.), toothed wheel 63 rotates through 1/20 of a revolution (case of twenty bands of collecting areas), we choose a wheel 63 having 40 teeth, of the same module as wheel 57b (for instance 1.5). The accurate positioning of drum 8b in each of its angular positions is for instance ensured, as in the first embodiment, by the cooperation of a ball 46 urged by a spring 47 with holes provided at regular intervals in disc 48 so as to constitute a marking device.

The operation of the device according to FIGS. 8 and 9 is identical to that above stated with reference to FIGS. 3 to 7, with the exception of the transmission of movement from shaft 21a to drum 8b, which has been explained when describing the mechanical elements of this transmission.

We thus provide a device for detecting jacket bursts in nuclear reactors which permits of determining, with a high accuracy and a high sensitiveness, the proportion of short life fission products in a gaseous stream and consequently of quickly detecting a jacket burst, even of small importance, in a nuclear reactor, even cooled by a recycled gas (the radioactivity of which is high, even in the absence of jacket bursts, due to the bombardment of some constituents of the gas, such as argon, by the neutrons in the reactor), and of following the evolution of this burst as time goes on.

Its operation, according to a predetermined program, is automatic. It is housed in a unit which is gastight, transmission of the displacements from a driving motor disposed on the outside being obtained through the whole of this unit through a magnetic coupling device.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A device for detecting fissionable material jacket bursts in a nuclear reactor which comprises, in combination, a casing, a metallic drum movable in said casing, means carried by said casing forming, adjacent the periphery of said drum, a decay and ion formation chamber having an aperture closed in gastight fashion by a portion of the periphery of said drum forming an ion collecting area, said drum having therefore a plurality of collecting areas, the walls of said chamber flaring off from said aperture, at least one repulsion electrode carried by the end of said chamber located opposite said aperture, means for bringing said electrode to a high positive potential, means for circulating through said chamber a stream of gas from the space surrounding at least one fissionable material jacket, the volume of said chamber being such that this stream remains therein for at least one second, a radiation detector carried by said casing and means operatively connected with said drum for imparting thereto displacements according to a predetermined program so as to bring successive areas of the periphery of said drum first in a taring position opposite said radiation detector, then in ion collecting position in register with said aperture, and thirdly in measuring position, again opposite said radiation detector.

2. A device according to claim 1 in which said drum is rotatable about its axis in said casing and said displacements are rotations of said drum about said axis, the angle between the collecting position and the measuring position being equal to $m$ times the angle under which said collecting area is seen from said axis, this last mentioned angle being equal to $360°/n$, $n$ being the number of collecting areas over the periphery of said drum, $m$ and $n$ being incommensurable integers.

3. A device according to claim 1 comprising a motor operatively connected with said drum for driving it, and a gastight case surrounding said chamber and said motor.

4. A device according to claim 1 comprising means for placing said electrode alternately at a high positive potential for the collection of ions by said drum collecting area and at a high negative potential during the measurement operations.

5. A device for detecting fissionable material jacket bursts in a nuclear reactor which comprises, in combination, a casing forming an inner cavity of cylindrical shape, a metallic drum of elongated cylindrical shape housed in said cavity and fitting substantially therein, means carried by said casing forming, adjacent the periphery of said drum, a decay and ion formation chamber having an aperture in the wall of said casing, said aperture being closed in gastight fashion by a portion of the periphery of said drum forming an ion collecting area, said drum having therefore a plurality of collecting areas, the walls of said chamber flaring off from said aperture, at least one repulsion electrode carried by the end of said chamber located opposite said aperture, means for circulating through said chamber a stream of gas from the space surrounding at least one fissionable material jacket, the volume of said chamber being such that this stream remains therein for at least one second, a radiation detector carried by said casing close to said chamber along a line parallel to the drum axis and passing through said aperture, the outer wall of said drum being divided into a plurality of adjacent bands parallel to its axis and each of said bands including a plurality of adjacent ion collecting areas, control means carried by said casing for imparting to said drum a succession of translatory displacements parallel to said axis and alternately in one direction and the other to bring each of said collecting areas successively first opposite said detector then opposite said aperture, and then again opposite said detector, and control means for rotating said drum about its axis to bring each of said bands successively along the line passing through said detector and said aperture, whereby after all the collecting areas have been used successively for measurement, rotation of said drum permits of similarly using the collecting areas of the next band.

6. A device according to claim 5 in which the outer wall of said drum is of polygonal cross-section.

7. A device according to claim 5 in which the outer wall of said drum is of circular cross-section.

8. A device for detecting fissionable material jacket bursts in a nuclear reactor which comprises, in combination, a casing forming an inner cavity of cylindrical shape, a metallic drum of elongated cylindrical shape housed in said cavity and fitting substantially therein, means carried by said casing forming, adjacent the periphery of said drum, a decay and ion formation chamber having an aperture in the wall of said casing, said aperture being closed in gastight fashion by a portion of the periphery of said drum forming an ion collecting area, said drum having therefore a plurality of collecting areas, the walls of said chamber flaring off from said aperture, at least one repulsion electrode carried by the end of said chamber located opposite said aperture, means for circulating through said chamber a stream of gas from the space surrounding at least one fissionable material jacket, the volume of said chamber being such that this stream remains therein for at least one second, a radiation detector carried by said casing close to said chamber along a line parallel to the drum axis and passing through said aperture, the outer wall of said drum being divided into a plurality of adjacent bands parallel to its axis and each of said bands including a plurality of adjacent ion collecting areas, control means carried by said casing for imparting to said drum a succession of translatory displacements parallel to said axis and alternately in one direction and the other to bring each of said collecting areas successively first opposite said detector then opposite said aperture, and then again opposite said detector, control means for rotating said drum about its axis to bring each of said bands successively along the line passing through said detector and said aperture, whereby after all the collecting areas have been used successively for measurement, rotation of said drum permits of similarly using the collecting areas of the next band, a single driving shaft and transmission means for operatively connecting said shaft with both of said control means for operating them from said shaft.

9. A device according to claim 8 further comprising a gastight case surrounding said drum, said shaft and said transmission means, a motor located on the outside of said gastight case and magnetic coupling means for transmitting the movement of said motor to said shaft through the wall of said case.

10. A device according to claim 8 in which said transmission means comprise gear means interposed between said shaft and said first mentioned control means, said second mentioned control means being interposed between said drum and said casing for rotating said drum in said casing in response to a final translatory movement of said drum produced when all the collecting areas of a band have been used for measurement.

11. A device according to claim 8 in which said transmission means comprise a right and left threaded screw coupled in rotation with said shaft and a finger in engagement with said screw and operatively connected with said drum to have the same translatory movement as it, an epicycloidal gear train operatively connected with said shaft, and two gear wheels, one of said gear wheels being an ordinary gear wheel rotatable together with said drum, the other one having teeth over only a portion of its periphery adapted to engage the teeth of said ordinary gear wheel during a portion of every revolution of said other wheel.

References Cited in the file of this patent

FOREIGN PATENTS 818,685     Great Britain _____ Aug. 19, 1959

OTHER REFERENCES

Apparatus for Automatically Scanning Two-Dimensional Paper Chromatograms for Radio-Activity, by W. J. Wingo, from Analytical Chemistry, vol. 26, No. 9, September 1954.